United States Patent
Kim et al.

(10) Patent No.: US 10,553,884 B2
(45) Date of Patent: Feb. 4, 2020

(54) DRIVING CONTROL METHOD OF FUEL CELL SYSTEM

(71) Applicants: HYUNDAI MOTOR COMPANY, Seoul (KR); KIA MOTORS CORPORATION, Seoul (KR)

(72) Inventors: Dae Jong Kim, Yongin-si (KR); Sung Bum Choi, Seongnam-si (KR); Jong Jin Yoon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 289 days.

(21) Appl. No.: 15/792,531

(22) Filed: Oct. 24, 2017

(65) Prior Publication Data

US 2018/0175416 A1 Jun. 21, 2018

(30) Foreign Application Priority Data

Dec. 16, 2016 (KR) .................. 10-2016-0172782

(51) Int. Cl.
*H01M 8/04223* (2016.01)
*H01M 8/04537* (2016.01)
*H01M 8/04746* (2016.01)
*H01M 8/1018* (2016.01)

(52) U.S. Cl.
CPC ... *H01M 8/04231* (2013.01); *H01M 8/04559* (2013.01); *H01M 8/04567* (2013.01); *H01M 8/04753* (2013.01); *H01M 2008/1095* (2013.01)

(58) Field of Classification Search
CPC .............................................. H01M 8/04231
See application file for complete search history.

(56) References Cited

U.S. PATENT DOCUMENTS

| 6,124,054 A * | 9/2000 | Gorman ............. H01M 8/0267 429/408 |
| 2006/0263675 A1* | 11/2006 | Adzic ................ H01M 4/8652 429/424 |
| 2007/0003805 A1* | 1/2007 | Sugawara ......... H01M 8/04231 429/423 |

(Continued)

FOREIGN PATENT DOCUMENTS

KR 20110019274 A * 2/2011 ........ H01M 8/04179

OTHER PUBLICATIONS

KR20110019274Atranslation (Year: 2019).*

*Primary Examiner* — Brian R Ohara
(74) *Attorney, Agent, or Firm* — Morgan, Lewis & Bockius LLP

(57) ABSTRACT

A method of controlling the driving of a fuel cell system includes: determining whether the fuel cell system enters idle stop in which air supply to the fuel cell stack stops; dropping a DC-link terminal voltage controlled by a DC-DC converter up to a first set voltage by controlling an operation of the DC-DC converter connected to a DC-link terminal outputting generation power of the fuel cell stack at the time of entering the idle stop; and dropping a voltage of the fuel cell stack to reduce an oxide of platinum which is a catalyst of a fuel cell by allowing the anode exhaust gas to flow backward into a cathode of the fuel cell stack by performing the hydrogen purge in an idle stop state of opening the hydrogen purge valve after the voltage of the DC-link terminal drops.

17 Claims, 6 Drawing Sheets

(56) References Cited

U.S. PATENT DOCUMENTS

| | | | | |
|---|---|---|---|---|
| 2007/0037025 A1* | 2/2007 | Venkataraman | H01M 8/04097 | 429/413 |
| 2007/0059569 A1* | 3/2007 | Matsumoto | H01M 8/04231 | 429/429 |
| 2009/0325004 A1* | 12/2009 | Choi | H01M 8/04626 | 429/431 |

* cited by examiner

- PRIOR ART -

- PRIOR ART -

- PRIOR ART-

- PRIOR ART-

DRIVING CONTROL METHOD OF FUEL CELL SYSTEM

CROSS-REFERENCE TO RELATED APPLICATION

This application claims under 35 U.S.C. § 119(a) the benefit of priority to Korean Patent Application No. 10-2016-0172782 filed Dec. 16, 2016, the entire contents of which are incorporated herein by reference.

TECHNICAL FIELD

The present disclosure relates to a method of controlling the driving of a fuel cell system. More particularly, the present disclosure relates to a method of controlling the driving of a fuel cell system which reduces platinum oxide generated by oxidizing platinum which is a catalyst of a fuel battery cell before elution before elution while driving a fuel cell system to recover catalyst performance and prevent the platinum from being lost and increase durability performance of a fuel cell stack.

BACKGROUND

A fuel cell as a power generation device that converts chemical energy of fuel into electrical energy by electrochemically reacting fuel gas and oxidant gas may be widely used as industrial, household, and vehicular power supplies and used even for supplying power of small-sized electric/electronic products and portable devices.

Currently, as the vehicular fuel cell, a proton exchange membrane fuel cell or polymer electrolyte membrane fuel cell (PEMFC) having high power density is mot researched.

The PEMFC adopts hydrogen as the fuel gas and oxygen or air containing the oxygen as the oxidant gas.

The fuel cell includes a plurality of cells that generates the electrical energy by reacting the fuel gas and the oxidant gas and is generally used in a stack type in which the cells are stacked and assembled in series in order to satisfy a required output level.

Even in the case of the fuel cell mounted on a vehicle, as a high output is required, hundreds of cells individually generating the electrical energy are stacked in the stack type to satisfy such a requirement.

Herein, when a unit cell configuration of the PEMFC is described, the PEMFC is configured to include a membrane electrode assembly (MEA) in which catalyst electrode layers are attached to both sides of a membrane based on a polymer electrolyte membrane in which hydrogen ions move, a gas diffusion layer (GDL) supplying the fuel gas and the oxidant gas as reaction gas to the MEA and transferring the generated electrical energy, a gasket and a joining mechanism for maintaining airtightness and appropriate joining pressure of the reaction gas and cooling water, and a separation plate (bipolar plate (BP)) moving the reaction gas and the cooling water.

Herein, the MEA is configured to include the polymer electrolyte membrane capable of moving the hydrogen ions, and a cathode and an anode as electrode layers to which the catalyst is applied, which allows the hydrogen as the fuel gas and the air (alternatively, oxygen) as the oxidant gas to react to each other on both planes of the electrolyte membrane.

The gas diffusion layers for evenly distributing the fuel gas and the oxidant gas are stacked in an external part of the MEA, that is, the external parts of the cathode and the anode and the BP is positioned in the external part of the gas diffusion layer, which provides a flow path through which the reaction gas and the cooling water pass and supplies the reaction gas to the gas diffusion layer.

A gasket for sealing fluids, and the like are stacked to be interposed between components constituting the unit cell and the gasket may be provided while being integratedly molded to the MEA or BP.

A plurality of cells are stacked by using such a configuration as the unit cell, and thereafter, end plates for supporting the cells are coupled to an outermost part and the end plates and the cells are together joined by using a stack joining mechanism while the cells are stacked and arrayed between the end plates to configure the fuel cell stack.

The fuel cell system mounted on the fuel cell vehicle includes the fuel cell stack and apparatuses for supplying the reaction gas to the fuel cell stack.

That is, the fuel cell system includes the fuel cell stack generating the electrical energy from the electrochemical reaction of the reaction gas, a hydrogen supply apparatus supplying the hydrogen as the fuel gas to the fuel cell stack, an air supply apparatus supplying the air containing the oxygen as the oxidant gas to the fuel cell stack, a heat and water management system controlling a driving temperature of the fuel cell stack and performing heat and water management functions, and a fuel cell system controller controlling an overall operation of the fuel cell system.

In the general fuel cell system, the hydrogen supply apparatus may include a hydrogen storing unit (hydrogen tank), a regulator, a hydrogen pressure control valve, a hydrogen recirculation apparatus, and the like, the air supply apparatus may include an air blower or an air compressor, a humidifier, and the like, and the heat and water management system may include a water trap, an electric water pump (cooling water pump) and a water tank, a radiator, and the like.

In such a configuration, high-pressure hydrogen supplied from the hydrogen tank of the hydrogen supply apparatus is depressurized at a predetermined pressure in the regulator and thereafter, supplied to the fuel cell stack and in this case, the depressurized hydrogen is pressure-controlled according to a driving condition of the fuel cell stack to be supplied to the fuel cell stack while a supply amount is controlled.

In the fuel cell stack, hydrogen which does not react but remains is discharged through an outlet of an anode (hydrogen electrode) of the stack or recirculated to an inlet of the anode of the stack by the hydrogen recirculation apparatus.

The hydrogen recirculation apparatus is an apparatus capable of increasing reliability of hydrogen supply and improving a life-span of the fuel cell and various recirculation methods are provided, but a method using an ejector, a method using a blower, a method using both the ejector and the blower, and the like are known.

The hydrogen recirculation apparatus recirculates unreacted hydrogen which cannot be used and remains in the anode of the fuel cell stack to the anode (hydrogen electrode) of the stack through a recirculation pipe again to promote reuse of the hydrogen.

In the fuel cell, as foreign materials including nitrogen, water, and steam which flow to the anode through the electrolyte membrane in the stack increase, the hydrogen amount in the anode decreases and reaction efficiency thus deteriorates, and as a result, hydrogen purge may be performed by opening a hydrogen purge valve installed on an exhaust line of the stack anode.

That is, the hydrogen purge valve for the hydrogen purge is installed on a pipe at the outlet of the anode of the fuel cell stack to allow the foreign materials including the nitrogen, the water, and the like to be discharged and removed together with the hydrogen in the anode of the stack, and as a result, a hydrogen concentration in the anode is controlled and maintained at an appropriate level to increase a hydrogen utilization rate.

When the foreign materials in the fuel cell stack are discharged, there are advantageous such as control of the appropriate hydrogen concentration in the anode, increase in hydrogen utilization rate, and improvement of a gas diffusion degree and reactivity.

Meanwhile, the durability life-span of the fuel cell stack is a very important element in securing merchantability of the fuel cell vehicle.

Therefore, various efforts for increasing the durability life-span of the fuel cell stack (preventing the deterioration of the stack are competitively made and various causes for the deterioration of the stack are also investigated.

A cause which forms a great part among them is loss of platinum (Pt) used as the catalyst that activates the reaction of the oxygen and the hydrogen in the stack.

When the loss of the platinum is continued and accelerated in the MEA, reactivity of the hydrogen and the oxygen deteriorates, and as a result, the performance of the stack deteriorates.

When the driving of the fuel cell is continued, the platinum is continuously oxidized and it is almost impossible to fundamentally prevent a phenomenon in which the oxidized platinum PtO or $PtO_2$ is eluted, and as a result, the platinum disappears.

Therefore, an oxidization speed of the platinum is delayed or the oxidized platinum is rapidly reduced again before the oxidized platinum is eluted to delay a losing speed of the platinum.

It is important to maintain a potential to activate the corresponding reaction for delaying the oxidation speed of the platinum and reducing the platinum and a potential area in which the platinum may be oxidized and a potential area in which a platinum oxide may be reduced are distinguished to some degree based on the potential of the cells of fuel the cell stack.

In more detail, an oxidation reaction or a reduction reaction of the platinum occurs according to the potential of the cells of the fuel cell stack.

For example, in the cells of fuel cell stack, in an oxidation section (a voltage increase direction section) to a specific potential or higher, for example, 0.8 V or higher, the oxidation reaction of the platinum dominantly occurs and in a reduction section (e.g., 0 to 0.8 V, a voltage decrease direction) of 0.8 V or lower, the reduction reaction of the platinum dominantly occurs.

When a driving mode between 0.7 to 1.0 V is applied, the oxidation of the platinum occurs more frequently than the reduction of the platinum and when the driving is continued within such a potential range, the platinum losing occurs, in which as the platinum reacts with water ($H_2O$), chemical dissolution occurs and the platinum is thus eluted.

It is experimentally and theoretically revealed that as the potential decreases, the reduction reaction is more actively progressed and when voltage distribution of actual driving vehicles is analyzed, the oxidation section in which average cell voltage is 0.8 V or higher mostly occupies 50% or more in a whole section, and as a result, it is very important to increase the frequency of the voltage decrease direction (reduction section) to increase a possibility that the platinum oxide will be reduced in order to reduce the loss of the platinum.

However, in the existing fuel cell hybrid system, the control degree of freedom for stack voltage is low and there is a high possibility that a range of the stack voltage which is primarily driven will be a voltage range in which the phenomenon in which the platinum is oxidized is dominant, and as a result, the existing fuel cell hybrid system is very disadvantageous in terms of the durability of the stack.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

Therefore, the present disclosure provides a method of controlling the driving of a fuel cell system which reduces platinum oxide generated by oxidizing platinum which is a catalyst of a fuel battery cell before elution while driving a fuel cell system to recover catalyst performance and prevent the platinum from being lost and increase durability performance of a fuel cell stack.

In one aspect of the present disclosure, a method of controlling the driving of a fuel cell system in which hydrogen purge is performed by opening a hydrogen purge valve to discharge anode exhaust gas of a fuel cell stack through a cathode outlet of the fuel cell stack, includes: determining, by a controller, whether the fuel cell system to enters idle stop in which air supply to the fuel cell stack stops; dropping, by the controller, a DC-link terminal voltage controlled by a DC-DC converter up to a first set voltage by controlling an operation of the DC-DC converter connected to a DC-link terminal outputting generation power of the fuel cell stack at the time of entering the idle stop; and dropping, the controller, a voltage of the fuel cell stack so as to reduce an oxide of platinum which is a catalyst of a fuel cell by allowing the anode exhaust gas to flow backward into a cathode of the fuel cell stack by performing the hydrogen purge in an idle stop state of opening the hydrogen purge valve after the voltage of the DC-link terminal drops.

As a result, by the method of controlling the driving of a fuel cell system according to the present disclosure, voltage of a fuel battery cell stack is reduced by a method that performs hydrogen purge at the time of entering an idle stop of the fuel cell system to reduce a platinum oxide generated by oxidizing platinum which is a catalyst of the cells of the fuel cell stack before elution.

The stack voltage reduction control and platinum oxide reduction processes of the present disclosure can be simply performed only by configuring control logic in a controller without adding separate hardware and effects of recovery of catalyst performance, prevention of loss of the platinum, and an increase in durability performance of the fuel cell stack are provided.

In order to prevent hydrogen consumption from being increased due to the hydrogen purge, a control to shorten and compensate a purge time at the time of performing the hydrogen purge during normal driving of the fuel cell system is performed as much as a hydrogen purge time during the idle stop to perform the platinum reduction and stack voltage reduction control while maintaining the same level as the related art without increasing the hydrogen purge time and a purge amount in overall.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
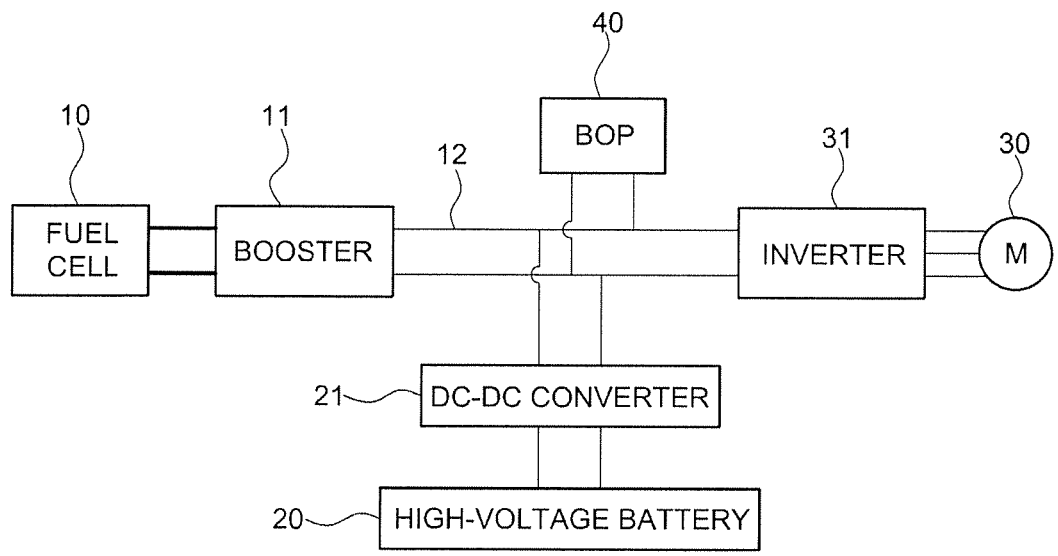
FIGS. 1 and 2 are diagrams illustrating a high-voltage power net configuration of a conventional fuel cell battery hybrid system.

Reference numerals set forth in the Drawings includes reference to the following elements as further discussed below:

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, embodiments of the present disclosure will be described in detail with reference to the accompanying drawings so that those skilled in the art can easily implement the embodiments of the present disclosure. However, the present disclosure is not limited to embodiments described below, but materialized in another form.

Throughout the specification, unless explicitly described to the contrary, the word "comprise" and variations such as "comprises" or "comprising," will be understood to imply the inclusion of stated elements but not the exclusion of any other elements.

The present disclosure has been made in an effort to provide a method of controlling the of a fuel cell system which reduces platinum oxide generated by oxidizing platinum which is a catalyst of a fuel battery cell before elution while driving a fuel cell system to recover catalyst performance and prevent the platinum from being lost and increase durability performance of a fuel cell stack.

As already known, a unit cell of a polymer electrolyte membrane fuel cell includes a membrane electrode assembly (MEA) in which catalyst electrode layers are attached to both sides of a membrane based on an electrolyte membrane as a primary component and the catalyst electrode layers attached to both sides of the membrane become a cathode electrode to which oxygen gas (air) is supplied and an anode electrode to which fuel gas (hydrogen) is supplied, respectively.

Platinum (Pt) is widely used as a catalyst of the catalyst electrode layer and the platinum which is a precious metal catalyst may be oxidized according to a cell potential while driving a fuel cell system and further, a platinum loss phenomenon may occur, in which a generated oxide PtO or $PtO_2$ is eluted and lost.

When the loss of the platinum occurs, catalyst performance deteriorates and durability of a stack deteriorates (the stack is degraded), and as a result, it is necessary to recover the catalyst performance by reducing oxidized platinum catalyst particles before the oxidized platinum catalyst particles are eluted.

Therefore, the present disclosure includes a method of controlling the driving of a fuel cell which reduces the oxidized platinum while driving the fuel cell system.

As a method for restricting upperlimit voltage of the fuel cell stack, methods for delaying an oxidation speed of the platinum are proposed, but a more positive driving control method for reducing the already oxidized platinum is required and this method becomes a method that may improve the durability performance of the stack.

The oxidation and the reduction of the platinum continuously occur while driving the fuel cell system, but occurrence degrees of oxidation and reduction reactions vary depending on the potentials thereof.

That is, as the potential increases, the oxidation reaction is dominant and as the potential decreases, the reduction reaction is dominant.

Accordingly, the stack voltage needs to be dropped up to the potential at which the reduction reaction is dominant in order to recover the oxidation of the platinum, which occurs while driving the fuel cell system and in the case of the existing fuel cell hybrid system, that is, a non-booster type fuel cell hybrid system, it is difficult to drive the system by dropping the stack voltage to a desired area.

Even though the system is driven by dropping the stack voltage up to the desired area, such a driving state becomes a state as if driving the system by lowering the efficiency of the fuel cell, and as a result, the efficiency may deteriorate.

Accordingly, it is necessary to drive the fuel cell system by lowering the voltage of the stack without deteriorating the efficiency of the fuel cell system and to this end, the present disclosure presents a method that drives the fuel cell system by intermittently and positively lowering the stack voltage to a level to reduce the platinum oxide according to a situation by using an idle stop state to temporarily stop generation of the fuel cell.

Therefore, the platinum oxide is reduced again without deteriorating the driving efficiency of the fuel cell system to prevent the loss of the platinum and improve the catalyst performance and the durability performance of the stack.

Hereinafter, booster type and non-booster type fuel cell hybrid systems will be described in order to assist appreciating the present disclosure.

When only a fuel cell is used as a power source (electric power source) of a vehicle in a vehicular fuel cell system, since the fuel cell needs to take charge of all loads in the vehicle, the fuel cell may be driven in a driving area in which efficiency is low, and as a result, performance may deteriorate in the driving area in which the efficiency of the fuel cell is low.

When a radical load is applied to the fuel cell, output voltage of the fuel cell rapidly drops in a moment, and as a result, sufficient electric power may not be supplied to a drive motor for driving the vehicle, thereby degrading the performance of the vehicle.

Since the fuel cell generates electrical energy by an electrochemical reaction, it is difficult to cope with rapid load fluctuation and since the fuel cell has a unidirectional output characteristics (only discharge is available) most of all, regenerative energy generated by a motor may not be recovered in braking the vehicle or coast driving, and as a result, system efficiency deteriorates.

Figure 2:
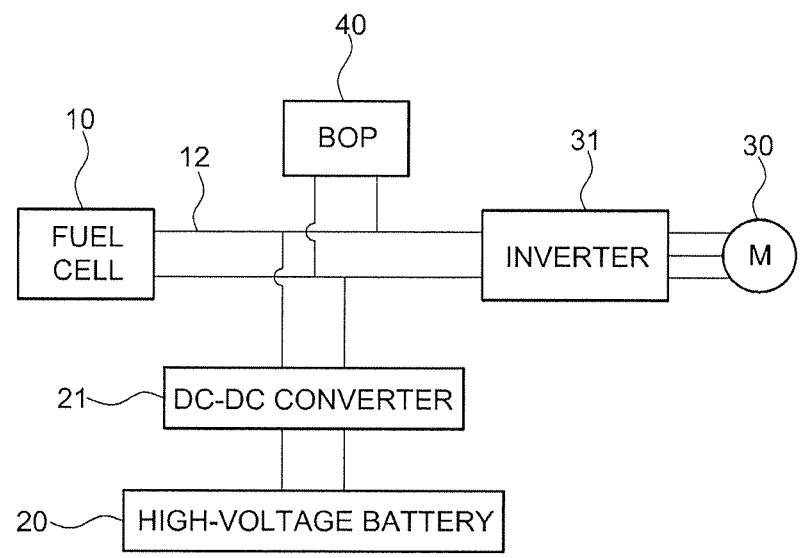

As a countermeasure for remedying the disadvantages, an energy storage apparatus which is a separate auxiliary power source for driving a drive motor 30 and a high-voltage component 40, for example, a chargeable/dischargeable high-voltage battery 20 or a supercapacitor (supercap) is mounted in addition to a fuel cell 10 which is a primary power source as illustrated in FIGS. 1 and 2.

FIGS. 1 and 2 are diagrams illustrating a high-voltage power net configuration of a fuel cell battery hybrid system having the fuel cell 10 as the primary power source and the high-voltage battery 20 as the auxiliary power source. FIG. 1 illustrates a boost type fuel cell hybrid system having a booster 11, and FIG. 2 illustrates a non-booster type fuel cell hybrid system without the booster.

As illustrated in FIGS. 1 and 2, the fuel cell 10 and the motor (drive motor) 30 for driving the vehicle are connected to each other through a DC-link terminal 12 and the high-voltage battery (main battery) 20 is connected to the DC-link terminal 12 via a DC conversion apparatus for conversion of the electric power, that is, a DC-DC converter 21.

By using the fuel cell 10 and the high-voltage battery 20 as the electric power source (power source), high-voltage loads in the vehicle are connected to the DC-link terminal 12 connected with the power sources in parallel to two power sources.

As the high-voltage load, the motor 30 which becomes a driving source for driving the vehicle, that is, the drive motor 30 is connected to the DC-link terminal 12 via an inverter 31 and the inverter 31 converts DC current of the fuel cell 10 or the battery 20 into 3-phase AC current and applies the 3-phase AC current to the motor 30 to drive the motor.

In such a configuration, the battery 20 is connected to the motor 30 to be chargeable and dischargeable, and as a result, motor driving power is supplied from the battery through the DC-DC converter 21 at the time of driving the motor (in the driving mode) and in this case, the inverter 31 converts the electric power of the battery into 3-phase AC power and applies the 3-phase AC power to the motor.

The electrical energy generated by the motor 30, which serves as a generator, is transferred to the battery 20 through the DC-DC converter 21 to charge the battery when the motor is regenerated (in a regenerative mode) when braking the vehicle or in the coast driving.

The high-voltage driving component 40 of the fuel cell system which needs to be driven while driving the fuel cell, that is, a balance of plant (BOP) such as an air blower or a recirculation blower is connected to the fuel cell 10 and the battery 20 which become the power sources through the DC-link terminal 12.

The BOP 40 is driven by receiving generated power of the fuel cell 10 or charging power of the battery 20.

In the booster type fuel cell hybrid system, the booster 11 is mounted on an output terminal of the fuel cell, which converts and controls the electric power output from the fuel cell 10 and in the non-booster type fuel cell hybrid system, the booster is not provided.

One of differences between the two systems is a degree of freedom of fuel cell voltage control.

That is, since the booster type system may increase the voltage of the fuel cell 10 by using the booster 11, even though the voltage of the fuel cell is maintained to be very low, the booster type system may maintain voltage with which the BOP 40 or the D-DC converter 21 and the inverter 31 for driving the motor 30 may normally operate while driving the fuel cell system.

However, in the non-booster type system, since the voltage of the fuel cell 10 directly becomes the driving voltage of the BOP 40, the DC-DC converter 21, the inverter 31, and the like, the voltage of the fuel cell needs to be maintained to specific voltage or higher in order to enable the fuel cell system to be driven.

When the BOP, the DC-DC converter, the inverter, and the like are designed to be driven at low voltage, an area of a required voltage (current) specification is excessively widened to cause cost to increase, and as a result, the non-booster type system is generally configured in such a manner that the components may operate only within a predetermined voltage range.

In this case, there is a constraint that the voltage of the fuel cell needs to be maintained to specific voltage or higher.

Therefore, the booster type system is more advantageous in terms of the degree of driving freedom of the voltage of the fuel cell, that is, in terms of driving at voltage at which the durability of the stack less deteriorates.

In the non-booster type fuel cell hybrid system, it is very important to develop a method (a voltage sweep method) which can reduce drivable voltage to maintain the durability performance of the stack.

In the case of the non-booster type fuel cell hybrid system, the voltage (stack voltage) of the fuel cell may not decrease to a system acceptable lower limit (e.g., 250 V) or lower in order to guarantee operability of high-voltage electric components, that is, the BOP, the DC-DC converter, the inverter, and the like which become the electric loads of the fuel cell.

As a unique state in which the stack voltage may decrease to the system acceptable lower limit or less, when the vehicle stops, the vehicle is subject to downhill driving in which the vehicle is driven on a downhill, or a required output is very small or other fuel cells need not make an output, the fuel cell may be maintained in a driving state of an idle mode to interrupt supply of air by stopping driving an air supply apparatus, that is, driving an air blower or air compressor.

In the present specification, the fuel cell driving state and mode under such a condition will be collectively referred to as an idle stop state and mode.

Figure 3:
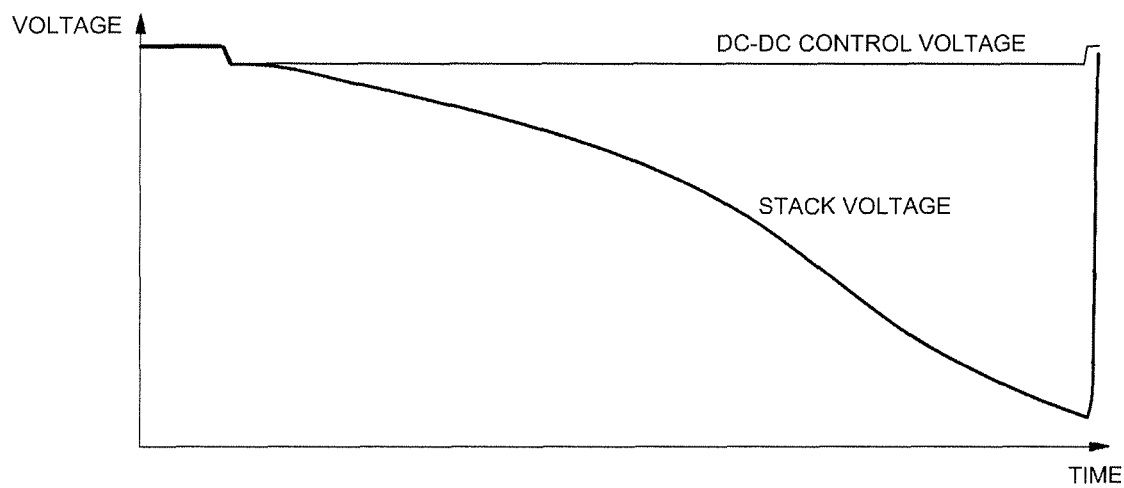
FIG. 3 is a diagram illustrating a reduction pattern of fuel cell voltage during idle stop in the conventional fuel cell system.

FIG. 3 is a diagram illustrating a reduction pattern of fuel cell voltage during idle stop.

When the driving mode of the fuel cell system enters the idle stop mode, no air is supplied to the fuel cell stack any longer and moreover, as illustrated in FIG. 3, the voltage of the DC-link terminal 12 which is a high-voltage terminal is maintained at a predetermined level through the DC-DC converter.

In this case, the voltage of the stack decrease up to voltage controlled by the DC-DC converter while charging the high-voltage battery and thereafter, when the air in the stack is sparse, the voltage of the stack decreases to the voltage below the voltage, which is controlled by the DC-DC converter.

As seen in FIG. 3, when the fuel cell voltage gradually decreases at the time of entering the idle stop mode and a long time elapses, the fuel cell may reach a potential to reduce the platinum.

However, the time is flowable according to a state of the stack, but a time of approximately 20 seconds is required until the voltage decreases to 0.7 V or lower, at which a reduction reaction of PtO is activated and a time of 40 seconds to 1 minute is required for 0.4 V or lower, at which reduction of $PtO_2$ is activated.

In an actual driving section of the vehicle to which the non-booster fuel cell hybrid system is applied, a frequency in which the voltage decreases up to an area where the reduction of PtO and $PtO_2$ is activated is not high.

A situation in which the driving mode frequently reaches up to the idle stop state may occur sometimes, but there are many cases in which a driver reaccelerates the vehicle in the case of a conventional driving pattern, and as a result, in actuality, a situation in which the stack voltage drops does not normally occur before the vehicle is maintained to stop for a long time.

Therefore, in a situation in which positive drop of the voltage is impossible in a driving section in which an actual load exists, the idle stop state of the fuel cell system needs to be positively used.

A method for positively dropping the voltage of the stack in the idle stop state includes 1) a method for dropping DC-DC control voltage (DC-link terminal voltage controlled by the DC-DC converter) up to the voltage of system acceptable lower limit or 2) a method for performing the hydrogen purge.

In this case, dropping the DC-DC control voltage up to the area where the reduction of PtO may actively occur is advantageous in terms of the durability of the stack.

Dropping the voltage by using the hydrogen purge needs to be performed in parallel to peculiarity of the fuel cell system configuration and may be applied only by adding a function to recover the amount of consumed hydrogen by purging the hydrogen.

As a result, the present disclosure presents a method that may effectively reduce the stack voltage in the idle stop to compensate the resulting efficiency reduction, in particular, a method that may decrease only the voltage without an increase in consumption of the hydrogen.

Figure 4:
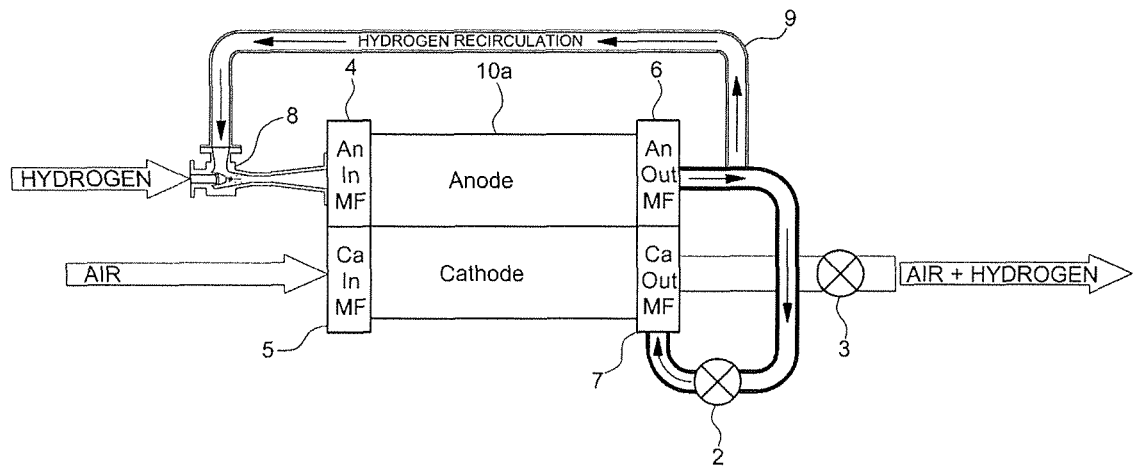
FIG. 4 is a diagram schematically illustrating movement paths of air and hydrogen in the conventional fuel cell system.

FIG. 4 is a diagram schematically illustrating movement paths of air and hydrogen in the fuel cell system and hydrogen supplied by a hydrogen supply apparatus is supplied to an anode of the stack through an ejector 8 and an anode inlet manifold 4 of a stack 10a while being mixed with anode exhaust gas recirculated through a recirculation pipe 9, that is, recirculation gas containing the hydrogen.

Simultaneously, the air supplied by the air supply apparatus is humidified and thereafter, supplied to a cathode of the stack through a cathode inlet manifold 5 of the stack 10a.

In the hydrogen purge, the anode exhaust gas discharged through an anode outlet manifold 6 of the stack 10a is mixed with cathode exhaust gas discharged through a cathode outlet manifold 7 of the stack and thereafter, discharged to the outside.

As already known, in order to control and maintain a hydrogen concentration in the anode of the stack 10a at a predetermined level or higher while driving the fuel cell, a process is required, which discharges gas and moisture at the anode, in which the hydrogen concentration decreases and injects new hydrogen as much thereas and this process is referred to as the hydrogen purge.

The hydrogen purge may be periodically performed based on estimation of the hydrogen concentration in the anode or the hydrogen purge may be performed whenever a current integration value acquired by integrating current generated from the stack reaches a predetermined reference value.

Referring to FIG. 4, in the hydrogen purge, the gas and the moisture discharged from the anode outlet enter the cathode outlet manifold 7, and thereafter, discharged to the outside while being mixed with the cathode exhaust gas and the anode exhaust gas (purged gas) containing the hydrogen is diluted with the air discharged from the cathode of the stack 10a to discharge the anode exhaust gas diluted with the air to the outside while reducing the hydrogen concentration in the gas (the anode exhaust gas needs to satisfy discharged gas concentration regulations).

However, when the flow of the air emitted from the cathode of the stack 10a is a predetermined amount or more, the anode exhaust gas may be normally diluted with the cathode exhaust gas and thereafter, discharged, but when the flow of the air emitted from the cathode is less than the predetermined amount, the anode exhaust gas containing the hydrogen may flow backward into the cathode of the stack.

When such a phenomenon occurs, the voltage of the stack rapidly decreases while a direct reaction ($H_2+O_2 \rightarrow H_2O$) of the hydrogen and the oxygen occurs in the cathode.

However, if such a phenomenon occurs when the fuel cell needs to normally make an output; a problem may occur in maintaining the normal output of the fuel cell.

However, when such a phenomenon is appropriately used in a situation in which the stack voltage needs to be dropped, such a phenomenon may significantly contribute to improvement (reduction of the oxidized platinum) of the durability of the stack.

When the hydrogen is directly injected into the cathode of the stack by using the hydrogen purge while the air supply to the cathode of the stack stops in the idle stop mode, the stack voltage may be dropped up to a desired area within a short time.

In this case, as the concentration of the oxygen in the cathode is sparser, a voltage drop effect significantly increases.

Accordingly, in the present disclosure, the voltage drop control using the hydrogen purge is performed during the idle stop, and the concentration of the oxygen (air) in the cathode of the stack becomes sparse to some degree, that is, it is verified that the stack voltage is lower than predetermined voltage and thereafter, the stack voltage is dropped to the potential or less, at which the reduction of $PtO_2$ occurs.

In this case, it may be more effective to close an air cut-off valve 3 at a cathode outlet of the stack in order to maximize the voltage drop effect even with a small hydrogen purge amount.

However, when the hydrogen purge is used for the purpose of dropping the stack voltage, more hydrogen may be lost than the hydrogen under the existing driving condition.

The loss of the hydrogen causes the system efficiency and fuel efficiency to decrease, but a purpose of the hydrogen purge is to allow the stack to show normal performance by maintaining the hydrogen concentration in the anode of the stack at a predetermined level or higher by inevitably performing the hydrogen purge even though the hydrogen is lost.

In the present disclosure, an effect of increasing the hydrogen concentration in the anode of the stack is still effective even if the hydrogen purge is performed for the purpose of lowering the stack voltage during the idle stop.

Therefore, in the present disclosure, if the hydrogen purge for the purpose of the voltage drop during the idle stop is performed, it may compensate for the purge time at which the hydrogen purge has been performed for the purpose of the voltage drop at the time of reaching a normal hydrogen purge time point.

That is, during the normal driving of the fuel cell system, normal hydrogen purge for controlling a hydrogen concentration in the anode of the stack is performed, and the hydrogen purge is performed by reducing the time by the time when the previous hydrogen purge for the voltage drop is performed at the time of reaching the normal hydrogen purge time. Thus, it is possible to maintain the hydrogen concentration while maintaining the total hydrogen purge time and achieve the purpose of the voltage drop without unnecessary waste of hydrogen.

As such, in the present disclosure, the hydrogen purge performed for the stack voltage drop during the idle stop and the normal hydrogen purge for controlling the hydrogen concentration in the anode of the stack during normal driving are separately performed, and during hydrogen purge during normal driving, the hydrogen purge may be performed by reducing the time by the hydrogen purge time for the voltage drop during the idle stop.

Herein, the hydrogen purge performed during the normal driving of the fuel cell system means general hydrogen purge in which anode exhaust gas of the stack is discharged to the outside while being mixed with cathode exhaust gas by opening an air cut-off valve 3.

It is inefficient to drop the voltage by performing the hydrogen purge whenever the idle stop driving is entered.

If the number of purge times performed during the idle stop is larger than the number of hydrogen purge operation times during normal driving, the compensation control of the purge time reduction described above may not be performed, and thus unnecessary hydrogen loss may be caused.

Therefore, the voltage drop using the hydrogen purge may be performed only when the idle stop mode is maintained under a specific condition (for example, a specific time or a stack voltage condition).

Figure 5:
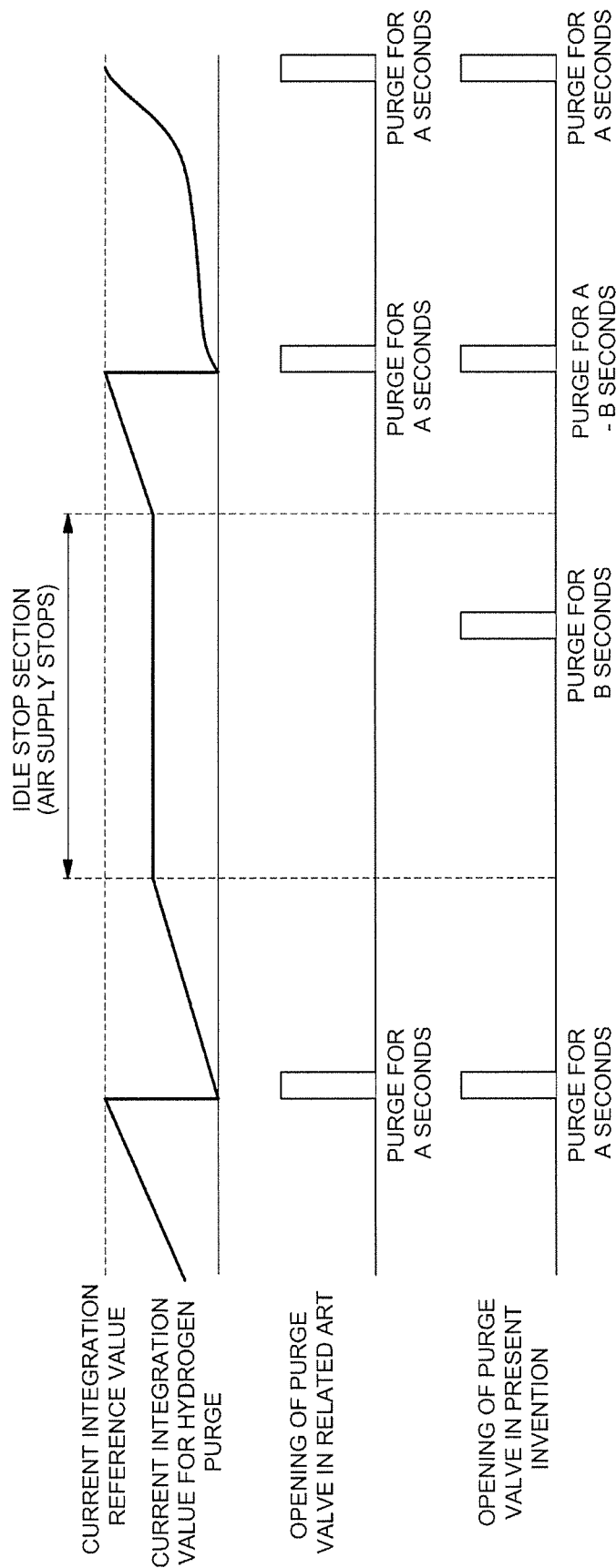
FIG. 5 is a diagram illustrating a timing chart comparing and showing states in which hydrogen purge in the present disclosure and the hydrogen purge in the related art are performed.

FIG. 5 is a timing chart illustrating a comparison of states of hydrogen purge in the present invention and hydrogen purge in the related art are performed, and as known, the hydrogen purge is performed by opening the hydrogen purge valve 2 installed in a stack anode exhaust line and the known general hydrogen purge may be set to be performed whenever a current integrated value obtained by integrating a current generated in the stack reaches a predetermined current integrated reference value.

Such general hydrogen purge is performed for enhancing use efficiency of the hydrogen while maintaining a hydrogen concentration in the anode at an appropriate level by discharging foreign substances such as nitrogen, water and water vapor present in the anode of the stack to the outside.

In the present disclosure, the hydrogen purge valve 2 is opened in the idle stop section where the air supply of the fuel cell stack is interrupted to perform the hydrogen purge for the purpose of the stack voltage drop and at the next general hydrogen purge point of time, hydrogen purge is performed only for the time which is reduced and compensated by the time of the hydrogen purge for the voltage drop which has been performed during the previous idle stop.

That is, after the hydrogen purge for the voltage drop is performed during the idle stop, when the current integrated value reaches the current integration reference value during normal driving to perform the normal hydrogen purge, the purge time is reduced by the hydrogen purge time for the voltage drop which is previously performed.

Figure 6:
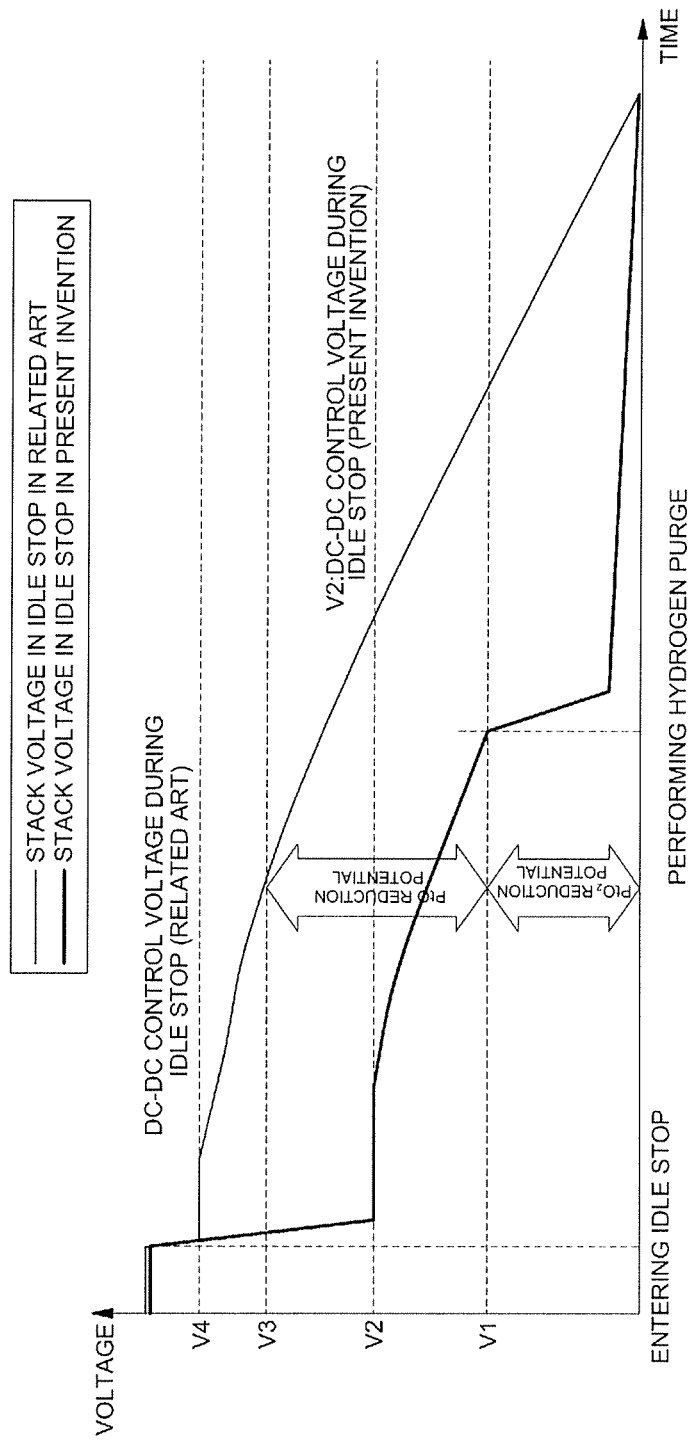
FIG. 6 is a diagram comparing and illustrating voltage behaviors in an idle stop mode in the related art and the present disclosure.

FIG. 6 is a diagram illustrating a comparison of voltage behavior in an idle stop mode in the related art and in the present invention, in which V4 represents a DC-DC control voltage in a conventional idle stop and V2 represents a DC-DC control voltage during the idle stop in the present invention.

As illustrated in FIG. 6, V2 may be set to a voltage value in a potential region in which a reduction reaction of PtO may occur in the fuel cell.

V3 represents a potential at which the reduction of PtO as platinum oxide may start, and V1 represents a potential at which the reduction of $PtO_2$ as another platinum oxide may start.

The V3 is a reference potential at which the reduction of PtO is regularized, and is a voltage value which is not used in an actual control process as described below.

The V1 is a reference potential at which the reduction of $PtO_2$ is regularized, which is a voltage value preset and input in a controller (which may be a fuel cell system controller in the present invention) and is used to determine whether to perform the hydrogen purge for the stack voltage drop as described below.

A stack voltage range lower than V3 is a potential range where reduction of PtO may occur and a stack voltage range lower than V1 is a potential range where reduction of $PtO_2$ may occur.

As illustrated in the drawing, in the present invention, when the fuel cell system enters the idle stop mode, a DC-link terminal voltage controlled by the DC-DC converter 21, that is, a DC-DC control voltage is set at a lower level than that of the related art, and in particular, the DC-DC control voltage is set to be low up to the level that the reduction of PtO may actively occur.

Therefore, when the fuel cell system enters the actual idle stop mode, the controller controls the driving of the DC-DC converter 21 in a state where the air supply to the fuel cell stack is stopped to reduce the DC-DC control voltage (DC-link terminal voltage) up to the voltage V2 of FIG. 6 where the reduction of PtO may actively occur, thereby allowing the voltage of the stack to rapidly and abruptly drop to the voltage V2.

As such, when the voltage of the stack drops to the set V2, which is the DC-DC control voltage during the idle stop, the voltage of the stack further drops from the V2 while the air in the stack becomes sparse.

Thereafter, while the idle stop mode of the fuel cell system is maintained and then the supply of the air is stopped, the voltage of the stack drops to be lowered up to a predetermined voltage V1, the controller controls the operation of the hydrogen purge valve 2 to perform the hydrogen purge, and thus the voltage of the stack quickly and rapidly drops to the voltage at the level where reduction of $PtO_2$ may actively occur.

As described above, in the present invention, when the idle stop of the fuel cell system is entered, the DC-DC converter 21 is controlled to lower the DC-DC control voltage to a region (voltage V2) where the reduction of PtO is active, and thus the voltage of the stack rapidly drops up to the DC-DC control voltage V2 to induce the reduction reaction of PtO.

Subsequently, the idle stop state is kept long while the air supply is stopped and the hydrogen purge is performed only under a condition that the idle stop holding time exceeds a set time from the time when the idle stop is entered and a condition that the voltage of the stack drops up to a preset V1 (a potential region at which reduction of $PtO_2$ may occur) so as to induce the reduction of $PtO_2$ and PtO to occur more actively.

Figure 7:
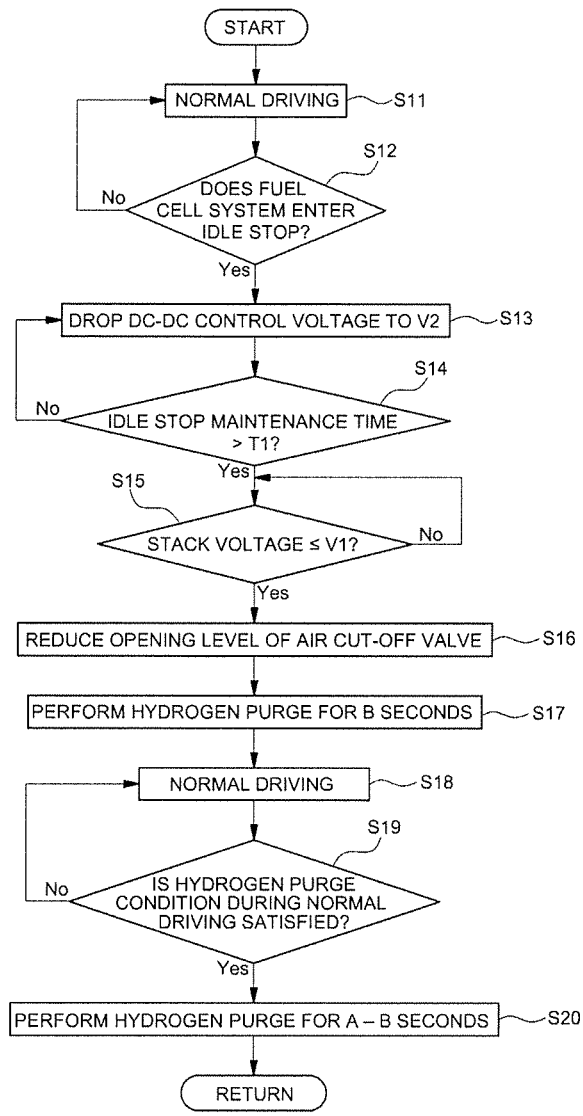
FIG. 7 is a flowchart illustrating a method of controlling the driving of a fuel cell system according to an embodiment of the present disclosure.

FIG. 7 is a flowchart illustrating a method of controlling the driving of the fuel cell system according to the embodiment of the present invention and a control process will be described below with reference to FIG. 7.

In the present invention, the stack voltage drop and compensation method is largely divided into three processes.

That is, the control process according to the present invention includes a process of lowering the DC-DC control voltage (the DC-link terminal voltage controlled by the DC-DC converter) when the idle stop is entered to the voltage at which the reduction of PtO may actively occur, a process of lowering the voltage of the stack to the voltage level at which the reduction of $PtO_2$ may actively occur by performing the hydrogen purge for the stack voltage drop for a predetermined time when the idle stop state is maintained for a predetermined time and the voltage of the stack is lower than the DC-DC control voltage by a predetermined level or more, and a process of performing the hydrogen purge only for a time obtained by subtracting the hydrogen purge time for the stack voltage drop from a predetermined hydrogen purge time when a normal hydrogen purge time comes.

Referring to FIG. 7, when the controller confirms the entry into the idle stop mode during normal driving of the fuel cell system (S1), the controller controls the operation of the DC-DC converter 21 to lower a voltage controlled by the DC-DC converter 21, that is, the DC-DC control voltage to a level of a first set voltage V2 (S12 and S13).

Next, when the time has elapsed so that the idle stop holding time exceeds the first set time T1, the controller verifies whether the voltage of the stack drops in the idle stop state (the air supply stop state to the stack) to be lowered to a second set voltage V1 or lower (V1<V2) (S14 and S15).

Herein, when the voltage of the stack is lower than the second set voltage, the controller closes the air shutoff valve 3 installed at a cathode outlet side of the stack or reduces an opening amount (S16) and subsequently, the hydrogen purge for the stack voltage drop is performed by opening the hydrogen purge valve 2 for the second set time (B seconds) (S17).

As such, when the hydrogen purge is performed, the voltage of the stack rapidly drops to become a level where the reduction of $PtO_2$ may actively occur.

Thereafter, the idle stop mode is released and the normal driving of the fuel cell system is performed (S18), and then the controller opens the hydrogen purge valve 2 when the current integrated value obtained by integrating the current generated in the stack reaches a predetermined current integration reference value to perform normal hydrogen purge for controlling the hydrogen concentration in the anode of the stack (S19 and S20).

At this time, if the hydrogen purge for the stack voltage drop at the idle stop is performed immediately before the general hydrogen purge time is predetermined, the hydrogen purge is performed by opening the hydrogen purge valve 2 by a time (A-B second) obtained by subtracting the hydrogen purge time (B seconds as the second set time) performed for the previous stack voltage drop from the third set time (A seconds) for the general hydrogen purge.

The first set time T1 is a reference value of an elapsed time after entering the idle stop capable of performing hydrogen purge for the stack voltage drop and is a time preset in the controller. As described above, in the present invention, the hydrogen purge for the stack voltage drop may be performed under the condition that the time from the time when the idle stop mode is entered exceeds the T1.

The second set time B is a time (B<A) preset in the controller to open the hydrogen purge valve 2 during the hydrogen purge for the stack voltage drop during the idle stop, and the third set time A is a time preset in the controller to open the hydrogen purge valve 2 during the hydrogen purge while the normal driving for controlling the hydrogen concentration in the anode of the stack.

Figure 8:
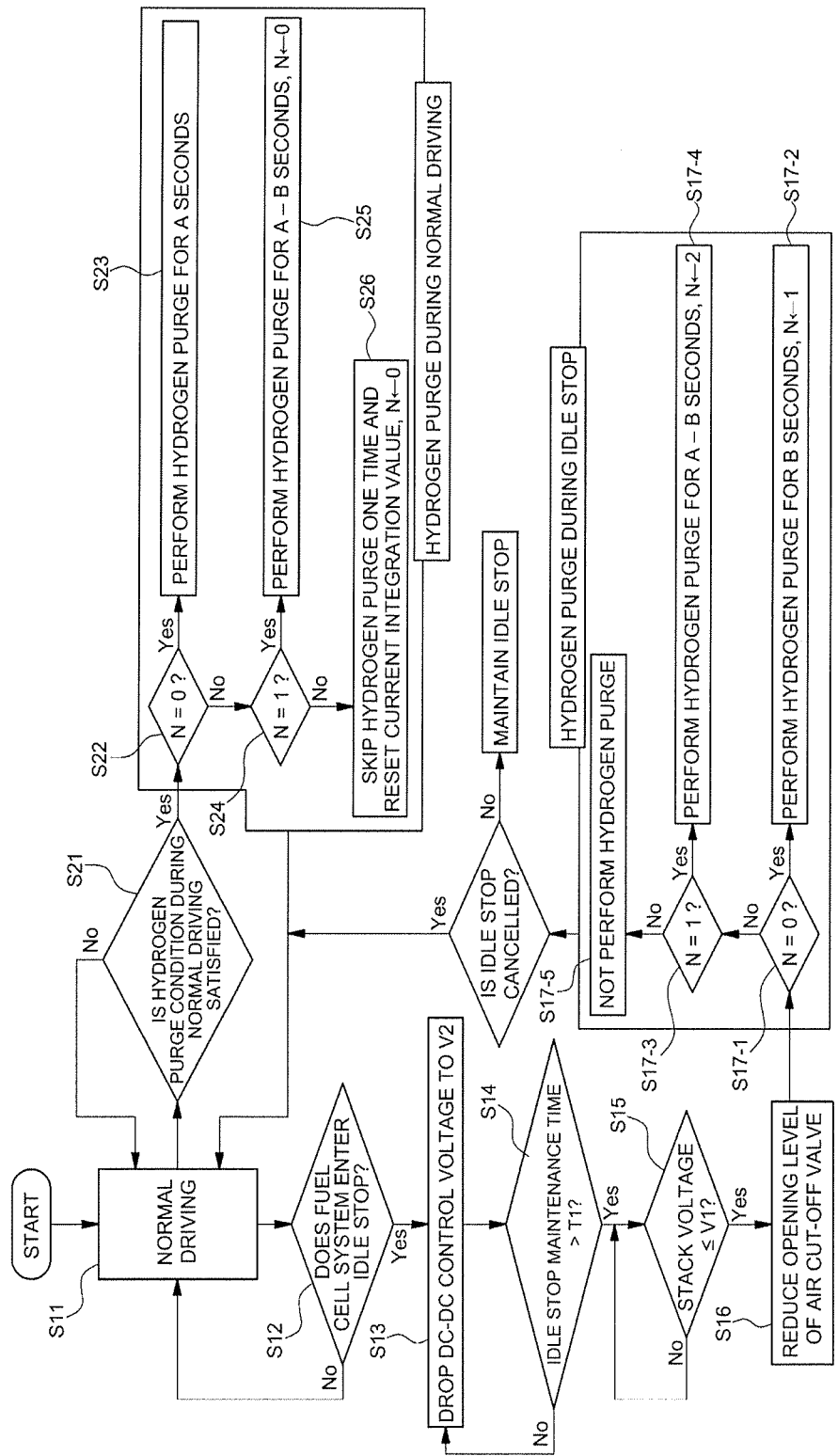
FIG. 8 is a flowchart illustrating, in more detail, a hydrogen purge process during normal driving and idle stop of the fuel cell system.

Meanwhile, FIG. 8 is a flowchart illustrating the hydrogen purge process during the normal driving of the fuel cell system and during the idle stop in more detail.

FIG. 7 illustrates only a basic situation in which the purging time is reduced and compensated during the hydrogen purge during the normal driving after the hydrogen purge for the stack voltage drop control is performed during the idle stop of the fuel cell system.

On the other hand, FIG. 8 illustrates a more detailed control process including a case in which when the voltage drop control condition during the idle stop is satisfied again before the hydrogen purge is performed at the normal driving of the fuel cell system, that is, a situation in which the idle stop is repeatedly entered and cancelled.

When the situation where the entering and canceling of the idle stop is repeated and the stack voltage drop control condition during the idle stop is repeatedly satisfied, the hydrogen purge for the stack voltage drop is performed only until two consecutive occurrences, but the hydrogen purge for the stack voltage drop is not performed in the case of three consecutive occurrences.

In the case of the two consecutive occurrences, first, the hydrogen purge is performed for B seconds and second, the hydrogen purge is performed for A-B seconds.

In the state where the number of hydrogen purge times for the stack voltage drop is reset (there is no history of performing the hydrogen purge for the stack voltage drop after the previous normal hydrogen purge), the hydrogen purge is performed for a general set time when the normal hydrogen purge is performed, that is, the third set time of A seconds, whereas if the hydrogen purge for the stack voltage drop is performed once (B second) immediately before the hydrogen purge, the hydrogen purge is performed for A-B seconds during the normal hydrogen purge.

When the normal hydrogen purge needs to be performed by satisfying the hydrogen purge condition during the normal driving of the fuel cell system, if the hydrogen purge for the stack voltage drop is already continuously performed twice or more immediately before the hydrogen purge, the normal hydrogen purge is skipped once at the time even though the hydrogen purge condition during the normal driving is satisfied.

This is because it may be regarded that the hydrogen concentration in the anode of the stack is already sufficient due to the previous hydrogen purge for the stack voltage drop, one time of the normal hydrogen purge is skipped. Thus, the total hydrogen purge time and the purge amount are not increased, but are maintained at the same level compared with the related art but maintained at the same level to perform the stack voltage drop control.

Steps S11 to S16 in FIG. 8 are the same as described in FIG. 7.

However, when describing steps S17-1 to S17-5 in FIG. 8, without the hydrogen purge process during normal driving of the fuel cell system, when the hydrogen purge conditions for the stack voltage drop during the idle stop are continuously satisfied, first (When N=0), hydrogen purge is performed for B seconds (S17-1 and S17-2), and second (when N=1), hydrogen purge is performed for A-B seconds (S17-3 and S17-4).

In the case of satisfying two or more continuous conditions, from the third, the hydrogen purge is not performed (S17-5).

When describing the hydrogen purge process when the fuel cell system is normally operated, when the hydrogen purge needs to be performed by satisfying the hydrogen purge condition during the normal driving, if the hydrogen purge at the idle stop immediately before the hydrogen purge is not performed (N=0), the hydrogen purge is performed for B seconds (S21, S22, and S23).

On the other hand, if the hydrogen purge at the idle stop is performed once immediately before the hydrogen purge (N=1), the hydrogen purge is performed for A-B seconds (S24 and S25), and if the hydrogen purge at the idle stop is performed twice or more immediately before the hydrogen purge, one hydrogen purge during the normal driving is skipped and the current integrated value is reset (S26).

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling driving of a fuel cell system, in which hydrogen purge is performed by opening a hydrogen purge valve to discharge anode exhaust gas of a fuel cell stack through a cathode outlet of the fuel cell stack, the method comprising:
    determining, by a controller, whether the fuel cell system enters idle stop in which air supply to the fuel cell stack stops;
    dropping, by the controller, a DC-link terminal voltage controlled by a DC-DC converter up to a first set voltage by controlling an operation of the DC-DC converter connected to a DC-link terminal outputting generation power of the fuel cell stack when entering the idle stop; and
    dropping, by the controller, a voltage of the fuel cell stack to reduce an oxide of platinum, which is a catalyst of a fuel cell, by allowing the anode exhaust gas to flow backward into a cathode of the fuel cell stack by performing the hydrogen purge in an idle stop state of opening the hydrogen purge valve after the voltage of the DC-link terminal drops.

2. The method of claim 1, further comprising:
    closing, by the controller, an air cut-off valve at a cathode outlet of the fuel cell stack or reducing an opening level of the air cut-off valve before performing the hydrogen purge after dropping the voltage of the DC-link terminal.

3. The method of claim 1, wherein the first set voltage is a voltage value in a potential area in which a reduction reaction of PtO as the oxide of the platinum may occur in cells of the fuel cell stack.

4. The method of claim 1, wherein the controller performs a step of performing the hydrogen purge for dropping the voltage of the fuel cell stack when a determined fuel cell driving condition is satisfied after the dropping of the DC-link terminal voltage while the fuel cell system enters the idle stop.

5. The method of claim 2, wherein a determined fuel cell driving condition includes a condition in which an idle stop maintenance time from the time when the fuel cell system enters the idle stop is more than a first set time.

6. The method of claim 5, wherein a determined fuel cell driving condition is a condition in which the voltage of the fuel cell stack drops to be low to a second set voltage or less, and
    wherein the second set voltage is less than the first set voltage.

7. The method of claim 6, wherein the second set voltage is a voltage value in which a reduction reaction of PtO2 as the oxide of the platinum starts in cells of the fuel cell stack.

8. The method of claim 2, wherein a determined fuel cell driving condition includes a condition in which the voltage of the fuel cell stack drops to be a second set voltage or less,
    wherein the second set voltage is less than the first set voltage.

9. The method of claim 8, wherein the second set voltage is set in the controller as a voltage value in which a reduction reaction of PtO2 as the oxide of the platinum starts in cells of the fuel cell stack.

10. The method of claim 1, wherein a purge time of opening the hydrogen purge valve at the time of performing the hydrogen purge for dropping the voltage of the fuel cell stack is set as a second set time.

11. The method of claim 10, further comprising:
    performing, by the controller, the hydrogen purge during normal driving, which allows the anode exhaust gas of the fuel cell stack to be discharged to outside while being mixed with cathode exhaust gas when a hydrogen purge condition is satisfied after the idle stop state is cancelled and the fuel cell system is switched to a normal driving state.

12. The method of claim 11, wherein a hydrogen purge time is set in the controller when the hydrogen purge valve opens during the normal driving of the fuel cell system as a third set time, and
    first hydrogen purge during the normal driving is performed for a time acquired by subtracting the second set time from the third set time after the idle stop state is cancelled and the fuel cell system is switched to a normal driving state.

13. The method of claim 12, wherein the controller performs performing the hydrogen purge for dropping the stack voltage when a determined fuel cell driving condition is satisfied after the dropping of the DC-link terminal voltage while the fuel cell system enters the idle stop, and performs the hydrogen purge for the third set time when the hydrogen purge for dropping the stack voltage is not performed in the previous idle stop entering state at the time of performing the first hydrogen purge during the normal driving after the idle stop state is cancelled and the fuel cell system is switched to a normal driving state.

14. The method of claim 11, wherein the controller opens an air cut-off valve at a cathode outlet of the fuel cell stack to discharge the anode exhaust gas of the fuel cell stack to the outside while being mixed with cathode exhaust gas in the hydrogen purge during the normal driving.

15. The method of claim 10, wherein a hydrogen purge time is set in the controller when the hydrogen purge valve opens during normal driving of the fuel cell system is set as a third set time, and the controller performs hydrogen purge for second stack voltage drop for a time acquired by subtracting the second set time from the third set time when the hydrogen purge for dropping the stack voltage in the idle stop state is consecutively repeatedly performed without the hydrogen purge during the normal driving of the fuel cell system.

16. The method of claim 15, wherein the controller consecutively performs the hydrogen purge in the idle stop state up to a maximum of two times.

17. The method of claim 1, wherein the controller skips the hydrogen purge during a normal driving one time even though the determined hydrogen purge condition is hereafter satisfied while the fuel cell system is switched to a normal driving state when the hydrogen purge for dropping the stack voltage in the idle stop state is consecutively repeatedly performed without the hydrogen purge during the normal driving of the fuel cell system.

* * * * *